United States Patent
Upadhyay et al.

(10) Patent No.: US 12,461,797 B2
(45) Date of Patent: Nov. 4, 2025

(54) APPARATUS AND METHOD FOR UNPAIRED TIME SERIES DATA TRANSLATION

(71) Applicant: Anumana, Inc., Cambridge, MA (US)

(72) Inventors: Uddeshya Upadhyay, Karnataka (IN); Rakesh Barve, Bengaluru (IN); Shashi Kant, Karnataka (IN); Sairam Bade, Suryapet (IN); Ashim Prasad, Bangalore (IN); Shayan Ghosh, Karnataka (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/230,415

(22) Filed: Aug. 4, 2023

(65) Prior Publication Data

US 2025/0045129 A1 Feb. 6, 2025

(51) Int. Cl.
*G06F 9/54* (2006.01)

(52) U.S. Cl.
CPC .................... *G06F 9/541* (2013.01)

(58) Field of Classification Search
CPC .......... G06N 3/047; G06N 3/08; G06N 3/045; A61B 5/327; A61B 5/02416; A61B 5/7267; A61B 5/318; A61B 5/346; A61B 5/7264
See application file for complete search history.

(56) References Cited

U.S. PATENT DOCUMENTS

| | | | | |
|---|---|---|---|---|
| 2016/0203036 A1* | 7/2016 | Mezic | ................ | G06F 11/0751 714/819 |
| 2018/0247227 A1* | 8/2018 | Holtham | ................. | G06N 7/01 |
| 2021/0312406 A1* | 10/2021 | Dedes | ..................... | G06N 3/006 |
| 2022/0269958 A1* | 8/2022 | Ahmed | ................. | G06N 20/00 |
| 2023/0168639 A1* | 6/2023 | Carullo | ..................... | G06N 7/01 706/12 |
| 2023/0363655 A1* | 11/2023 | Sarkar | ..................... | G06N 3/047 |

FOREIGN PATENT DOCUMENTS

| | | |
|---|---|---|
| KR | 10-2021-0061769 A | 5/2021 |
| KR | 10-2321661 B1 | 11/2021 |
| WO | 2022/067439 A1 | 4/2022 |

* cited by examiner

*Primary Examiner* — Mahran Y Abu Roumi
(74) *Attorney, Agent, or Firm* — Caldwell Intellectual Property Law

(57) ABSTRACT

An apparatus and method for unpaired time series to time series translation is disclosed. The apparatus comprises at least a processor configured to receive an automated analysis of a time series, convert that time series from its initial domain to a usable time series within another user-selected domain, then to validate the conversion against a confidence threshold.

16 Claims, 12 Drawing Sheets

APPARATUS AND METHOD FOR UNPAIRED TIME SERIES DATA TRANSLATION

FIELD OF THE INVENTION

The present invention generally relates to the field of machine-learning. In particular, the present invention is directed to an apparatus and method for translating unpaired time series data between applications where protocols and formatting differences have previously made conversion and comprehension cumbersome.

BACKGROUND

Machine learning analysis of time series measurements, such as measurements from environmental sensors or medical devices, is an increasingly ubiquitous and vital component of the analytical data path originating from such measurements. However, the multiplicity of different encoding and recording protocols from the various forms of devices capturing those time series measurements makes training and use of such analysis inapplicable for most data sets that could otherwise be used, undermining the principal advantages that machine-learning could furnish.

SUMMARY OF THE DISCLOSURE

In an aspect, an apparatus for unpaired time series to time series translation is disclosed. The apparatus comprises at least a computing device configured to receive an automated analysis of a time series, convert that time series from its initial domain to a usable time series within another user-selected domain using machine-learning processes, then to validate the conversion against a confidence threshold.

In an aspect, a method for unpaired time series to time series translation is disclosed. The method comprises receiving, by a computing device, an automated analysis of a time series, converting, by the computing device, that time series from its initial domain to a usable time series within another user-selected domain, then validating, by the computing device, the conversion against a confidence threshold.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for unpaired time series to time series translation. The apparatus comprises at least a computing device configured to receive an automated analysis of a time series, convert that time series from its initial domain to a usable time series within another user-selected domain, then to validate the conversion against a confidence threshold.

Figure 1:
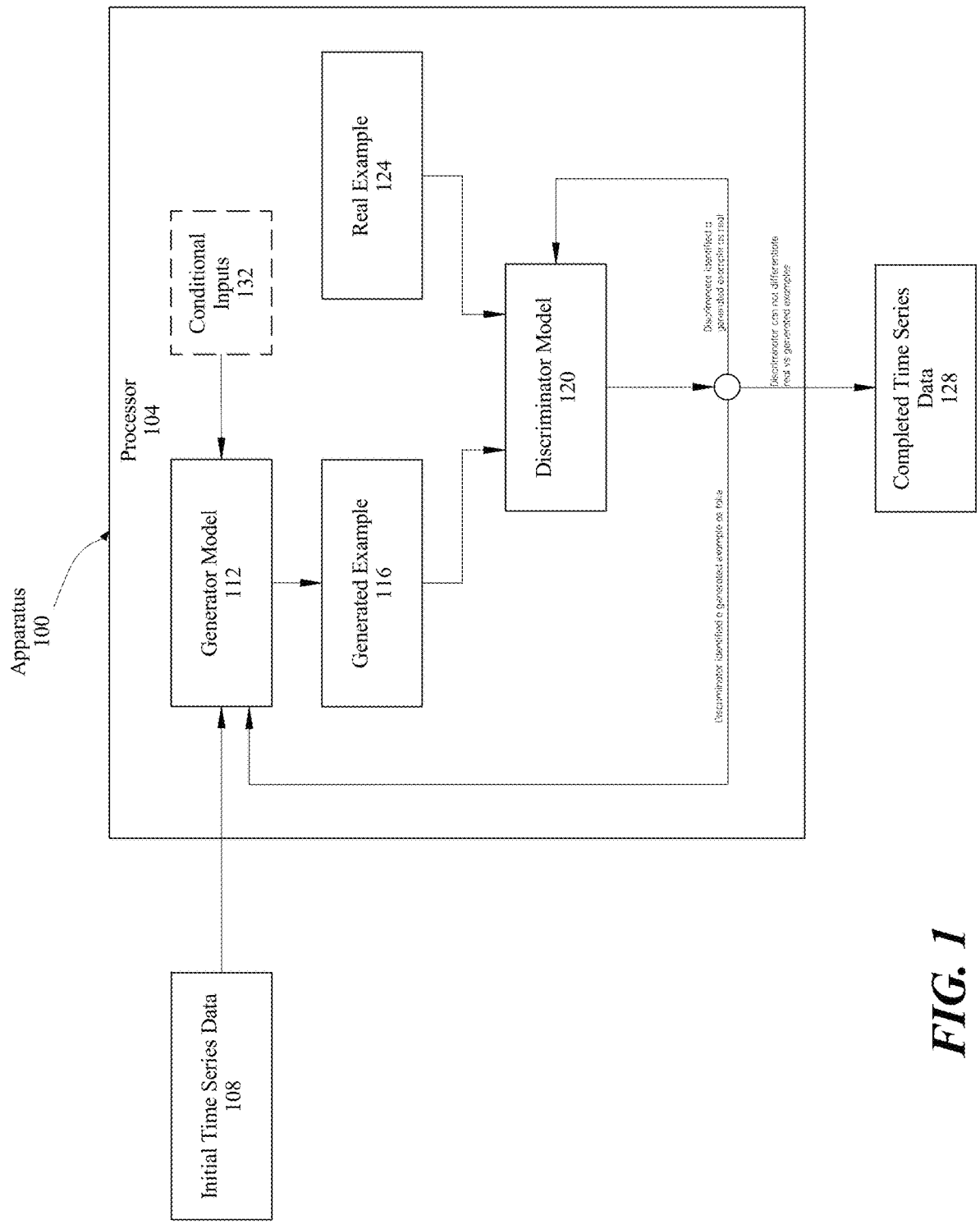
FIG. 1 is a block diagram of an exemplary embodiment of an apparatus for translating unpaired time series data between applications.

Referring now to FIG. 1, an exemplary embodiment of apparatus 100 for unpaired time series data translation is illustrated. The apparatus includes a processor 104. Processor 104 may refer to any computing device as described in this disclosure, including without limitation a microcontroller, microprocessor, digital signal processor (DSP), and/or system on a chip (SoC) as described in this disclosure. Processor 104 may include, be included in, and/or communicate with a mobile device such as a mobile telephone or smartphone. Processor 104 may include a single computing device operating independently, or may include two or more computing devices operating in concert, in parallel, sequentially, or the like; two or more computing devices may be included together in a single computing device or in two or more computing devices. Processor 104 may interface or communicate with one or more additional devices as described below in further detail via a network interface device. Network interface devices are described in detail below. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable the scalability of apparatus 100 and/or processor 104. Detailed description of a computing device embodiment is described below in reference to FIG. 12.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With further reference to FIG. 1, processor 104 is configured to receive, from at least a sensor, at least a time series of measured values recorded using at least an initial domain protocol. At least a sensor, as used herein, may include any sensor capable of collecting time series data including, without limitation, a device for capturing an electrocardiogram (ECG), also known as an ECG-enabled device, including without limitation any ECG device having any number of leads and/or electrodes, including without limitation a 12-lead ECG machine such as a Biocare 12-lead ECG machine, a 6-lead ECG machine, an exercise ECG machine, a Holter monitor, a wearable device such as an exercise ECG tracker, a smart watch having a wrist sensor, or the like, and/or any other device capable of capturing ECG data and/or any component thereof. At least a sensor may alternatively or additionally include any type of device capable of capturing electroencephalograms (EEGs), magnetic resonance imagers, electromyography scans (EMGs), galvanic skin response sensors, fitness trackers, blood pressure monitors, sleep trackers, blood-oxygen level monitors, heart rate trackers, blood glucose level, pulse oxygen level, or herpes trackers, immune disorder logs, or any other medical imaging or time series data capable of being plotted. At least a sensor may refer to standalone devices, such as those used exclusively in established medical facilities, such as magnetic resonance imagers, computerized tomography scans, x-rays, ultrasounds, radiotherapy equipment, intravenous monitors, or any other standalone device. While this disclosure openly discusses medical devices, the disclosure applies to any time series collection devices including non-medical applications. Additionally, at least a sensor may be a plurality of handheld, or wearable devices such as a Fitbit watch or wristband or other wearable heart rate monitor, a pacemaker or other cardiac rhythm management implant, glucose monitor, smart watch, real-time blood pressure sensors, temperature monitors, respiratory rate monitors or other biosensors, or any other wearable monitor.

Still referring to FIG. 1, for the purposes of this disclosure, "initial time series data" is a quantified representation of information usually derived from a digital device interrogation output, formatted based on the source device protocols and containing time series data capable of being plotted on a two-dimensional axis. Initial time series data 108 may be in image format, wherein the discrete data points may be identified and interpreted from the image. Initial time series data 108 may additionally be in the form of a plurality of quantified data points already plotted, contained in a list, or in some variation of a spreadsheet format. In other applications of Generative Adversarial Networks, inputs may include a plurality of different types or domains, including without limitation text, code, images, molecules, audio (e.g., music), video, and robot actions (e.g., electromechanical system actions). As a non-limiting example, an ECG recording's data set of voltage measured over a 30-second period at a frequency ranging from 50 Hz-500 Hz may be plotted, recorded, and/or used by processor 104 as initial time series data 108. Time-plotted voltages, especially within the range of voltages expected to be detected from a human heart through skin contact, exported from any capable device, may be used for initial time series data 108. In a non-limiting embodiment, initial time series data 108 may further include any set of plotted time series data which may be valuable within a separate set of domain protocols other than its original source protocols.

Further referring to FIG. 1, as a non-limiting example, initial time series data 108 may include a patient's blood pressure plotted over a specified time, heart rate, blood-sugar, stress test data, or any relevant time series data associated with a specified initial domain protocol. Time series data 108 may additionally contain identifying or descriptive data meant primarily to support the targeted time series data. For example, time series data 108 may include timing information for when the time series was initially recorded, appended notes from medical professionals, location data, or any other appropriate information. These additional data tags embedded within the time series data 108 may be used as training data to support pairing input data to output data. Specifically, in a non-limiting embodiment, in the example of an ECG time series, various inputs and grouping mechanisms may aid diagnosis of a cardiac irregularity, which may be an indicator of an atrial or ventricular fibrillation. Once confirmed by a medical professional, especially if in multiple instances of repeating similar circumstances, the machine learning model may identify patterns across these instances such that it could grow to act as an early warning system for more severe conditions. Continuing in this non-limiting embodiment, various types of input data included in time series data 108 may be grouped together in a logical manner to support these types of early warning diagnosis support. In an additional non-limiting embodiment, heart rate training data may support detecting and diagnosing a tachycardia or bradycardia condition, each of which may be indicative of severe or complex issues needing immediate response care. Additionally, blood pressure, electromyography data, computerized tomography (CT) scans, magnetic resonance imaging (MRI), or any other device where data is collected over time and is operative only within an initial domain protocol may be included in initial time series data 108.

Continuing to refer to FIG. 1, data collected from at least a sensor may be compiled within an initial time series data 108 grouping. This compilation may be accomplished by manually inputting time series data into processor 104, transferring files using any means available to transfer digital files, or through direct network connectivity where user has already established a network interface and protocol to exchange the time series data.

Still referring to FIG. 1, first time series of measured values is recorded using at least an initial domain protocol. As used in this disclosure, an "initial domain protocol" is a set of standards, formats, rules, interface convention and other domain-specific features that preclude initial time series data 108 from being used or processed by sensors or equipment other than the original sensing equipment. In a non-limiting embodiment, a 12-lead ECG may use various recording formats including 3×4, 3×4+R, 3×4+3R, 6×2, 6×2+R, 6×2+3R, 12, 12+R, 12+3R, and/or rhythm mode, then may record the data within its proprietary system; such a device may then enable subsequent translation to a JPG or XML format for saving. Each sensor-specific domain protocol varies based on the number of sensors used which may drastically change the data formats and application, but even devices that use the same number of sensors may differ in data format, processing algorithms, display mechanisms, organization, and prioritization. Data may, for instance, have dimensional differences; for instance, a 12-lead EKG may have 12 waveforms, which may be represented, without limitation, as a 12-channel and/or 12-dimensional signal, while a wearable device may have a signal made up of two channels and/or dimensions. Converting a 12-channel signal to a 2-channel signal or otherwise reducing channels and/or dimensions of a signal while optimally retaining information and/or minimizing noise or spurious correlations can be a non-trivial problem not amenable to averaging or projection. Similarly, converting a smaller number of channels into a higher number of channels and/or dimensions in a manner faithful to the differences in information between channels may be difficult or infeasible using conventional signal processing; solutions presented in this disclosure, including generative and/or neural network-based solutions as described herein, may enable conversions in either direction to produce useful data in a target channel and/or dimension set. Any or all of the time-series conversions and subordinate processes may be accomplished using a Generative Adversarial Network (GAN), diffusion-based machine-learning processes, neural network including but not limited to a deep learning neural network, or similar type of system. In a non-limiting embodiment, a GAN may be used to convert a 12-lead time series to be used within a 2-lead domain by inputting the 12-lead time series as an initial time series data set, then inputting a sample from the 2-lead domain in as a real example. Apparatus 100 may initially generate heuristic approximations then refine the generated examples until a discriminator module is unable to differentiate the artificially generated 2-lead datasets from the 2-lead sample provided. In a separate non-limiting embodiment, a diffusion-based model may purposefully inject noise into the 12-lead input, such that it may subsequently teach itself how to remove the noise as well as domain-dependent features, and in doing so, define a process to convert the 12-lead series to a universal time series or, by applying a new domain set of features, convert the 12-lead series to a 2-lead usable time series. In an additional non-limiting embodiment, a deep neural network may also be used to convert a 12-lead time series to a 2-lead time series by using hierarchical layers of supervised machine-learning models to scrape away domain-dependent features, then apply the 2-lead domain features. All of the listed methods may operate in the opposite or both directions (e.g. converting a 2-lead time series to a 12-lead time series format) and are discussed below in reference to FIGS. 1-5. As a further non-limiting example, an ECG machine may use application of Minnesota Code, CSE and/or AHA database formatting guidelines, as well as support for an ECG management system or HL7 protocol. Each of these specified formats and data exchange protocols may be interoperable with other ECG devices, but they may be exclusive to a hardware sensor and/or sensor component relied upon to generate the data. In other examples, initial domain protocol may be sufficiently limiting such that no alternative formats are available for translating or saving data captured therewith. For instance, a device such as a wearable ECG device may have ECG capability that is only compatible with a software application designed for that device; such a software application may further only be compatible with specific hardware platforms and/or operating systems, or specific versions thereof.

Still referring to FIG. 1, initial time series data 108 may include multiple time series each with separate domain protocol formats. Specifically, processor 104 may receive initial time series data 108 that may include a first time series and a second time series; each of first time series and second time series may include time-series data pertaining to the same category of process being measured, such as time-series data from the same type of diagnostic process or the like. In an embodiment, first time series may be recorded by and/or received from a first device while second time series may be recorded by and/or received from a second device; first device and second device may be different devices and/or different types of devices, and may record using the same initial domain protocol as each other or may record in two distinct initial domain protocols. Initial time series data may include a plurality of sets of time series data from a plurality of devices, of which any two devices may include a first device and second device as described above; such initial time-series data may include datasets in a plurality of distinct initial domain protocols. As a non-limiting example, multiple ECG data sets, which may be recorded with multiple initial domain protocols, may be used as initial time series data 108 to develop a single common protocol for the data sets from each ECG as described in further detail below. Conversion of initial domain protocols to a common protocol may enable a medical professional to use any or all such datasets within either or both hardware configurations to analyze the ECG data. Development of a common domain protocol may be used to support future conversions.

With continued reference to FIG. 1, initial time series data 108 may be received through a network of connected devices. In a non-limiting embodiment, a device that captures one or more elements of time series data and/or performs one or more steps described in this disclosure may be communicatively connected to one or more other devices, including without limitation any devices described in this disclosure, a local area network (LAN), a wide area network (WAN) such as the Internet or a subset thereof, such that all recorded data may be accessible via any other web enabled device. In this way, initial time series data 108 may be requested and imported into processor 104 via web or local network interface. Processor and/or another device may divide processing tasks between multiple processors to accelerate delivery of completed time series data 128.

With continued reference to FIG. 1, initial time series data 108 may be received through a direct file importing process, wherein initial time series data 108 may be saved and downloaded to processor 104. This may include file transfers from any type of hard drive or other memory type exchange or replication. Initial time series data 108 may be locally generated in cases where processor 104 is built in conjunction with or contained within an ECG-capable device. Time series data 108 may also be imported into processor 104 through manual generation, wherein a user populates all necessary data by any mechanism wherein the minimum required set of time series data is made available to apparatus 100.

Still referring to FIG. 1, processor 104 is configured to convert at least a time series from initial domain protocol to a target domain protocol using an unsupervised generative machine-learning process. As used in this disclosure, a "target domain protocol" is a domain protocol to which data received in one or more initial domain protocols is converted; target domain protocol may be a distinct domain protocol from each initial domain protocol or may be one of a plurality of initial domain protocols. Where two or more domain protocols exist for a given category of time-series data, target domain protocol may serve as a common domain protocol into which all other domain protocols are converted, permitting use of all such converted datasets as training data and/or inputs for a machine-learning model, display of all such converted datasets at or by a given device that can accept and/or display data using target domain protocol, or the like. In some embodiments, processor 104 may be used to generate a universal common domain such that the common domain may act as the target domain and/or be used as real example 124. Use of a common domain may allow for an immediate conversion of all time series data sets immediately after generation such that all data of a specific type may be collocated and compatible within the common domain. A common domain time series data may then either be converted to a separate, user-specified target domain by repetition of processes for conversion as described in this disclosure, or it may be used as it exists in the common domain format. In this way, a common domain implementation may be used as an intermediary interpretation, enabling the comparing and contrasting of multiple sources of time series data, while also simplifying the conversion from the common domain to the various target domains. Use of a common domain protocol may simplify various conversions by converting from thousands of device domains to a single, unitary domain format.

Continuing to refer to FIG. 1, conversion process may be performed using an unsupervised generative machine-learning process. An unsupervised machine-learning process may include an unsupervised machine-learning process as described in further detail below. A "generative machine-learning process," as used in this disclosure, is a type of unsupervised machine-learning where the algorithm is designed to use existing content such as text, audio, video, images, software code, or other data form to create new artifacts convincingly similar to the input artifacts. Generative machine-learning may accept a plurality of inputs or even specific portions or aspects from the plurality of inputs to inform the model to generate the new artifact(s). Generative machine-learning processes may be based on transformer-based models, which rely on internet based information to interact and create textual content for the user, or generative adversarial networks. For example, ChatGPT and Language Model for Dialogue Applications (LaMDA) interfaces are transformer-based generative machine-learning models designed to interact with humans in an informed, human-like, text-based communication protocol. As a non-limiting example, processor 104 may convert the at least a time series from the initial domain to a target domain protocol using a GAN. A "generative adversarial network" is a data structure that relies on a plurality of machine-learning models such as neural networks, deep learning neural networks, recurrent neural networks, or the like, wherein each internal model is plotted against the others with separate goals and motivators, such that the cumulative evolution of the models eventually generates the programmed output by competing against each other in a digitally hostile development cycle. For instance, and without limitation, processor 104 may use a GAN to execute a conversion from the initial domain protocol to the target domain protocol such that the plurality of models incrementally work against each other to generate domain independent features of initial time series data 108 within the target domain protocol. This process may operate based on a net-zero sum operation where one model stochastically generates an attempt at converting data while another model assesses the generated attempt against a set of actual, real-world target domain data. In one embodiment of a GAN, initial time series data 108 may operate as an input to a generator model 112. As used herein, a "generator model" is a process to create new artifacts, features, and/or data based on a plurality of input artifacts or data, or in some cases a random input vector. Generator model 112 may be configured to identify domain boundaries of a source domain and bound output generated example 116 to within those domain boundaries. "Domain boundaries," as used herein are established data standards or protocols, including but not limited to, data organization methods, formats, coding language, numerical maximums and/or minimums, data sizes, encryption type, or other specific limitations necessarily in place to ensure the encompassed data is usable. In a non-limiting embodiment, in reference to an ECG, domain boundaries may include a sample rate, specified collection duration, and an upper and lower voltage threshold. Generator model 112 may rely on stochastic methods, for instance and without limitation as described in further detail below to formulate generated example 116. Generated example 116 may be created by generator model 112 based initially on a random distribution such as without limitation a random Gaussian distribution. Generated example 116 may represent an attempt and/or approximation by generator model 112 at mimicking the real-world initial time series data 108. Initially, and prior to conversion, generated example 116 may be erratic and non-representative of initial time series data 108. Generator model 112 may use feedback such as error function generated using training data to adjust and improve its operation. Training data and machine-learning processes are discussed in detail below.

Still referring to FIG. 1, in the non-limiting embodiment of a GAN, generated example 116 from generator model 112 may be provided as one of the two inputs into discriminator model 120. A discriminator model 120 is a model, such as a machine-learning model and/or classifier, used to classify provided examples in a binary format of real or fake. Discriminator model 120 receives generated examples 116 and real examples 124. Real example 124 is a set of data from final target domain, or a set of data that the user wants to train discriminator model 120 to believe is target domain data. Discriminator model 120 may rely on real example 124 and binary classifier 128 feedback and/or feedback produced by and/or using discriminator model 120 and/or generator model 112 for training data. Discriminator model 120, without reference to the example source, assesses both generated example 116 and real example 124 for authenticity of the time series in the target domain. When discriminator model 120 wrongly identifies generated example 116 as real, binary classifier 128 then provides that incorrect assessment as training data to update discriminator model's 120 internal algorithms until discriminator model 120 stabilizes at around a 50% correct assessment rate. At the 50% correct assessment rate, discriminator model 120 is unable to detect differences between generated example 116 and real example 124, indicating generator model 112 is successfully replicating target domain protocols and formats. For example, if apparatus 100 is being used to translate ECG data from a domain protocol used by an Alivecor device to a domain protocol used by a General Electric ECG device, then initial time series data 108 may include the Alivecor ECG data being transferred. Continuing the non-limiting example, real example 124 may contain a plurality of ECG data sets from a General Electric ECG device. Real example 124 may be used as training data to compare and teach both generator model 112 and discriminator model 120. Training data and machine-learning processes are discussed in detail below in reference to FIG. 3.

Still referring to FIG. 1, in the non-limiting embodiment of a GAN, discriminator model 120 may deliver its binary assessment to a binary classifier 128. Binary classifier 128 may be another model, such as a machine-learning and/or neural network classifier, which is configured to identify and deliver an assessment of real or fake back to both generator model 112 and discriminator model 120. Discriminator model 120 is a machine-learning based entity that may rely on binary classifier 128 output as training data to continuously improve its model and ability to detect real versus fake examples. Binary classifier 128 and/or discriminator model 120 may operate based on simple digital logic with an input identifying the source of the example, and an input based on discriminator model's 120 assessment. Binary classifier 128 receives the real or fake assessment from discriminator model 120, identifies whether it is correct or not based on whether the example was fabricated or real then forces either generator model 112 to modify its processes when discriminator model 120 is correct, or it forces discriminator model 120 to modify its processes when discriminator model 120 is wrong. Alternatively or additionally, discriminator model 120 may include, be included in, or be binary classifier 128; in other words, processes and/or tasks described above for binary classifier 128 may be performed by discriminator model 120. In some embodiments, discriminator model 120 and/or binary classifier 128 may be trained together with and/or in the same training process as generator model 112. Training data and machine-learning processes are discussed in detail below in reference to FIG. 3.

Still referring to FIG. 1, in the non-limiting embodiment of a GAN, both generator model 112 and discriminator model 120 may make up a generative adversarial network and may be modified to continually attempt to out-perform their adversary, so that the generator outputs converge over training iterations, to accurate outputs in target domain protocol. As used in this disclosure, a "generative adversarial network" is a machine learning process that includes at least two adverse networks or models configured to synthesize data according to prescribed rules. When discriminator model correctly assesses that generated example 116 is fake, this assessment may force generator model 112 to modify its algorithm. Conversely, if discriminator model 120 falsely identifies a real example as fake, or a generated example 116 as real, discriminator model 120 may then be forced to modify its algorithm. In this way, every iteration may result in one of the two models being modified. This process of generator model 112 producing new generated examples 116 and discriminator model 120 assessing whether the input example is real or fake may iteratively continue until discriminator model 120 settles into a consistent 50% mix of real and fake assessments pertaining to generated example 116. Processor 104 may establish a threshold other than the 50% real versus fake assessments, including establishing a confidence threshold to force continued iterations until generated example 116 reaches a user-specified refinement. A user may, in some non-limiting examples, select a specific number of iterations of discriminator model 120 valuations, a percentage of correct or incorrect discriminator model 120 assessments, or may interject feedback at any point the user decides within the time series conversion process to modify or redirect processor 104. Integrated user feedback may allow user to introduce a manual valuation of generated example 116, which would then be used as a distinct form of training data to guide both generator model 112 and discriminator model 120. A conclusive state may indicate that generator model 112 is outputting generated examples 116 that so closely resemble real examples 124, that discriminator model 120 cannot differentiate what is real and fake. Upon reaching this conclusive state, processor 104 may export completed time series data 128.

Still referring to FIG. 1, generator model 112 may be capable of ingesting additional conditional inputs 132 to further bound and define its generated examples 116. As used herein, "conditional inputs" are extra information provided to both generator model 112 and discriminator model 120 to bias the output from both models. Conditional inputs 132 may be in the form of class labels, or data from other domains that user intends to incorporate to some extent within completed time series data 128. Conditional inputs 132 may include alternate versions of target ECG time series data sets. Additional conditions may further include any data, such as graphical data, used to bias generator model 112. In a non-limiting embodiment conditional input 132 may include a time series data set with different features from either initial time series data 108 or target time series data as provided by real example 124. This type of mixing of target data sets may enable a hybrid output which retains the benefits of multiple target time series data sets while shedding the undesirable features of each. Conditional inputs 132 may include a font type, color scheme, sample rate, data range or any other plurality of features user wants apparatus 100 to incorporate into completed time series data 128. In a non-limiting embodiment, user may combine all of the available time series protocols within a specific device type (i.e. ECG, respiratory monitor, glucometer, pulse oximeter, blood pressure monitor, etc.) by entering one of them as initial time series data 108, then using all of the others as conditional inputs 132. This type of bulk input may be effective at generating a common domain protocol which could be used as a type of universal translation step such that all initial time series are first translated to a common domain protocol, then subsequently translated to the target domain protocol.

Still referring to FIG. 1, in a non-limiting embodiment, processor 104 may execute this GAN process bi-directionally. A bi-directional GAN process, which may include without limitation a "CycleGAN" process, may operate by pairing a circuit, hardware and/or software module, and/or processor that works to convert initial time series data 108 to completed time series data 128, as described above, with a separate circuit, hardware and/or software module, and/or processor, still operating as described above, but in the reverse direction, wherein processor 104 translates completed time series data 128 back into the initial domain protocol. A bi-directional GAN process may additionally use the same circuit, hardware and/or software module, and/or processor for both directions of translation simultaneously, but using a time modulation method wherein the forward direction is conducted for the first half of each second, while the reverse direction is translated during the second half of each second, or any variation of dividing cycles based on time or sequence. Bi-directional GAN may rely on a pair of generators as described above, including without limitation neural network generators, each using outputs of the other as inputs. A bi-directional GAN process may enable forward and backward translation between domains to occur simultaneously, but dependently on each other.

Still referring to FIG. 1, in the non-limiting embodiment of CycleGANs, a CycleGAN processes may include a set of calculations. Training data used in CycleGAN differs from paired training data, wherein paired training data includes training examples where the correspondence between $x_i$ and $y_i$ already exists. In unpaired training data, as applied to CycleGAN processes, training data may include a source set and a target set, with no information provided as to which $x_i$ matches which $y_j$. In the case of unpaired data, starting with a time series in domain X and a different time series in domain Y, a general mapping may be enabled such that $G: X \to Y$, wherein the output $\hat{y}=G(x)$, $x \in X$ and is indistinguishable from time series $y \in Y$ by an adversary trained to classify $\hat{y}$ apart from y. CycleGAN processes may require that a translator operating in the reverse direction of a separate translator produce exactly inverse results such that $G: X \to Y$ and $F: Y \to X$, or in other words G and F are inverses of each other. A distinguisher $D_x$ as described above may operate as a distinguisher between time series $\{x\}$ and translated time series $\{F(y)\}$. Conversely, a distinguisher $D_y$ as described above may operate as a discriminator between $\{y\}$ and $\{G(x)\}$. An adversarial loss may be applied to both mapping functions such that:

$$\mathcal{L}_{GAN}(G, D_Y, X, Y) = \mathbb{E}_{y \sim p_{data}(y)}[\log D_y(y)] + \mathbb{E}_{x \sim p_{data}(x)}[\log(1 - D_y(G(x)))]$$

This process may be repeatable in a reverse direction and incentivized by reducing cycle consistency loss such that:

$$\mathcal{L}_{cyc}(G, F) = \mathbb{E}_{y \sim p_{data}(x)}[\|F(G(x)) - x\|_1] + E_{y \sim p_{data}(y)}[\|G(F(y)) - y\|_1].$$

An end result may be summarized by:

$$\mathcal{L}(G, F, D_X, D_Y) = \mathcal{L}_{GAN}(G, D_Y, X, Y) + \mathcal{L}_{GAN}(F, D_X, Y, X) + \lambda \mathcal{L}_{cyc}(G, F),$$

where $\lambda$ controls relative importance of objectives. Adversarial losses may be used in iterative steps to reduce bi-directional translation differences such that a process aims to replicate initial time series data 108 after converting it both in a forward direction to target domain protocol, then back to initial domain protocol. This validation process may rely on a confidence threshold whereby machine-learning processes use available training data to assess a level of match between initial time series data 108 and final, retranslated time series data after it has undergone both forward and reverse translations.

Still referring to FIG. 1, in a separate non-limiting embodiment, processor 104 may execute the conversion of the at least a time series from the initial domain protocol to a target domain protocol using an unsupervised generative machine-learning process by using a diffusion-based machine-learning process. A "diffusion-based process," as used in this disclosure, is a generative process that initially introduces randomly sampled noise to a data set, then trains itself to recover the data by reversing the noise introduction. Diffusion-based processes may include, without limitation, a stochastic differential equation (SDE) process, such as without limitation an energy-guided stochastic differential equation (EGSDE) process. In the non-limiting embodiment of an EGSDE diffusion-based model, EGSDE may rely on a score-based diffusion model (SBDM) to translate time series data from one domain to another. EGSDE's may use SBDMs to perturb the initial time series data to noise, such as without limitation Gaussian noise, then reverse the process to transform the noise back to the data distribution. This diffusion model may adapt a pretrained energy function based on data from initial source domain and data from final target domain to guide an inference process of a pretrained stochastic differential equation (SDE). As used herein, "energy function" is defined as a formulaic approximation of a transfer function to convert time series data from a source domain to usable data within a target domain. Energy function may be composed of two terms. A first guiding term is a "realistic expert," which is a term that prioritizes an energy function's focus on discarding source domain-specific features. A second guiding term is a "faithful expert," which is a term that prioritizes an energy function's focus on preserving domain-independent features. Combination of these two functions may result in a target domain data set agnostic of source domain data protocols, but which retains substantive features a source time series data manifested. In combination with a pretrained energy function, EGSDE methods may employ three experts (energy function, realistic expert, faithful expert) to contribute to generating a best fit output time series data in target domain protocol. A mathematical explanation of this process is described in detail: Let $q(y_0)$ be the unknown data distribution on $\mathbb{R}^D$. A forward diffusion process $\{y_t\}_{t \in [0,T]}$, indexed by time t, may then be represented by the following forward SDE:

$$dy = f(y, t)dt + g(t)dw,$$

where $w \in \mathbb{R}^D$ may be a standard Wiener process and/or other adaptive or stochastic filtration process, $f(\bullet, t): \mathbb{R}^D \to \mathbb{R}^D$ is a drift coefficient and $g(t) \in \mathbb{R}$ is a diffusion coefficient. As used herein, a "Wiener process" is a filter used in signal processing such that an estimate of a target domain may be produced using linear time-invariant filtering of a noisy process, by assuming a known stationary signal. In an embodiment, other adaptive and/or stochastic filtration processes may include least mean squared processes, least squares processes, frequency domain adaptive filters, or any other applicable filter. As used herein, an "adaptive filter" is a system with a filter having a transfer function controlled by variable parameters and a means to adjust those parameters according to an optimization algorithm and/or equation, such as without limitation a least mean squares, least squares, frequency domain adaptive, an Ornstein-Uhlenbeck process (i.e. a stationary Gaussian process), a Brownian-bridge (i.e. a Gaussian process with non-independent increments), and/or Weiner equation and/or process.

Still referring to FIG. 1, a Weiner process, $W_t$, is a real-valued continuous-time stochastic process characterized by the following properties:
1.) $W_t = 0$;
2.) W has independent increments where for every t>0, future increments $W_{t+u} - W_t$, $u \geq 0$, are independent of the past values $W_s$, s<t;

3.) W has Gaussian increments: $W_{t+u}-W_t$ is normally distributed with mean 0 and variance u, $W_{t+u}-W_t \sim \mathcal{N}(0,u)$; and 4.) W has almost surely continuous paths: $W_t$ is almost surely continuous in t.

An "Ornstein-Uhlenbeck process" is a stochastic process which is a modification of the Wiener process, such that the properties of the process have been changed to reflect a tendency of the random walk in continuous time to move backwards towards a central location, with a greater attraction when the process is further from the center. The Ornstein-Uhlenbeck process, $x_t$, is defined by the following stochastic differential equation:

$$dx_t = -\theta x_t dt + \sigma dW_t$$

Where $\theta>0$ and $\sigma>0$ are parameters and $W_t$ denotes the Weiner process. A Brownian-bridge is also a continuous-time stochastic process, $B_t$, whose probability distribution is the conditional probability distribution of a standard Wiener process, but bounded such that:

$$B_t := (W_t | W_t = 0), t \in [0, T]$$

Where a variance, $$\frac{t(T-t)}{T},$$

allows for the greatest uncertainty in the middle of the bridge with zero uncertainty at the nodes.

Still referring to FIG. 1, and in continued reference to the adaptive filter, the f(y,t) and g(t) may be related to noise size and may determine a perturbation kernel $q_{t|0}(y_t|y_0)$ from time 0 to t. If we allow $q_t(y)$ to be a marginal distribution of SDE at time t, its time reversal may then be described by a separate SDE:

$$dy = [f(y, t) - g(t)^2 \nabla_y \log q_t(y)]dt + g(t)d\overline{w},$$

where $\overline{w}$ signifies a reverse-time standard Wiener process or other adaptive and/or stochastic process, and dt represents an infinitesimal negative timestep. Then a score-based model, s(y,t), may be adopted to approximate an unknown $\nabla_y \log q_t(y)$ by score matching, and thereby inducing a SBDM, which is defined by an SDE:

$$dy = [f(y, t) - g(t)^2 s(y, t)]dt + g(t)d\overline{w}.$$

This may then be discretized using a Euler-Maruyama solver. By formally adopting a step size of h, the iteration rule from s to t=s−h is:

$$y_t = y_s - [f(y_s, s) - g(s)^2 s(y_s, s)]h + g(s)\sqrt{h}z, z \sim \mathcal{N}(0, I).$$

Still referring to FIG. 1, and still in reference to the non-limiting embodiment of a diffusion-based machine-learning process using EGSDE, using a set of unpaired data elements from the source domain $\chi \subset \mathbb{R}^D$ and the target domain $\gamma \subset \mathbb{R}^D$ as the training data, the goal is to transfer the original time series data from the source domain to the target domain. This goal may be accomplished by designing a distribution $p(y_0|x_0)$ on a target domain $\gamma$ conditioned on a time series $x_0 \in \chi$ to transfer. Translated time series data may be realistic for target domain by changing domain-specific features and faithful for source time series by preserving domain-independent features. An iterative latent variable refinement (ILVR) may then use a diffusion model on the target domain for realism. An ILVR starts from $y_T \sim \mathcal{N}(0,I)$ and samples from the diffusion model, described immediately above, for $y_T$. To promote faithfulness, $y_T$ may be further refined by adding a residual between the sample $y_T$ and the perturbed source image $x_T$ through a non-trainable low-pass filter:

$$y_T \leftarrow y_T + \phi(x_t) - \phi(y_t), x_t \sim q_{t|0}(x_t|x_0),$$

where $\Phi(\bullet)$ is a low-pass filter and $q_{t|0}(\bullet|\bullet)$ is a perturbation kernel determined by forward SDE. A valid conditional distribution $p(y_0|x_0)$ may be defined by compositing a pretrained SDE and a pretrained energy function under mild regularity conditions as follows:

$$dy = [f(y, t) - g(t)^2(s(y, t) - \nabla_y \mathcal{E}(y, x_0, t))]dt + g(t)d\overline{w},$$

where $\overline{w}$ is a reverse-time standard Wiener process, dt is an infinitesimal negative timestep such that $s(\bullet|\bullet): \mathbb{R}^D \times \mathbb{R} \to \mathbb{R}^D$ is the score-based model in pretrained SDE and $\mathcal{E}(\bullet,\bullet,\bullet): \mathbb{R}^D \times \mathbb{R}^D \times \mathbb{R} \to \mathbb{R}$ is the energy function. From there, a start point, $y_m$, may be sampled from perturbation distribution $q_{M|0}(y_M|x_0)$, where user may set M=0.5 T. Transferred time series data may be obtained by taking samples at endpoint t=0 following SDE.

Still referring to FIG. 1, and still in reference to the non-limiting embodiment of a diffusion-based machine-learning process relying on EGSDE, an energy function may be derived by balancing a need to retain domain-independent features of initial time series data 108, while appropriately altering domain-specific features. Based on this balance, an energy function may be expressed as a sum of two log potential functions:

$$\mathcal{E}(y, x, t) =$$
$$\lambda_s \mathcal{E}_s(y, x, t) + \lambda_i \mathcal{E}_i(y, x, t) = \lambda_s \mathbb{E}_{q_{t|0}(x_t|x)} S_S(y, x_t, t) - \lambda_i \mathbb{E}_{q_{t|0}(x_t|x)} S_i(y, x_t, t),$$

where $\mathcal{E}_i(\bullet,\bullet,\bullet): \mathbb{R}^D \times \mathbb{R}^D \times \mathbb{R} \to \mathbb{R}$ and $\mathcal{E}_s(\bullet,\bullet,\bullet): \mathbb{R} \times \mathbb{R}^D \times \mathbb{R} \to \mathbb{R}$ are the log potential functions, $x_t$ is the perturbed source image in the forward SDE, $q_{t|0}(\bullet|\bullet)$ is the perturbation kernel from time 0 to time t in the forward SDE, $S_S(\bullet,\bullet,\bullet): \mathbb{R}^D \times \mathbb{R} \to \mathbb{R}$ and $S_i(\bullet,\bullet,\bullet): \mathbb{R}^D \times \mathbb{R}^D \times \mathbb{R} \to \mathbb{R}$ are functions measuring similarity between the source time series and the perturbed time series, and $\lambda_s \in \mathbb{R}_{>0}$ are weighting hyper-parameters. To specify $S_S(\bullet,\bullet,\bullet)$, a time-dependent domain-specific feature extractor $E_S(\bullet,\bullet): \mathbb{R}^D \times \mathbb{R} \to \mathbb{R}^{C \times H \times W}$, where C, H, and W are specific feature descriptors of the output, may be used; $E_S(\cdot,\cdot)$ represents the all but last layer of a classifier trained on both domains to predict whether a time series is from the source domain or the target domain, while $S_S(\cdot,\cdot,\cdot)$ is defined as the cosine similarity between features, which may be implemented without limitation as vectors, extracted from generated example 116 and initial time series data 108 as follows:

$$S_S(y, x_t, t) = \frac{1}{HW} \sum_{h,w} \frac{E_s^{hw}(x_t, t)^T E_s^{hw}(y, t)}{\|E_s^{hw}(x_t, t)\|_2 \|E_s^{hw}(y, t)\|_2},$$

where $E_s^{hw}(\cdot,\cdot) \in \mathbb{R}^C$ denotes specific source features. $S_i(\cdot,\cdot,\cdot)$ may be specified by introducing a domain-independent feature extractor, $E_i(\cdot,\cdot): \mathbb{R}^D \times \mathbb{R} \to \mathbb{R}^D$, which may operate as a low-pass filter preserving domain-independent features and discarding domain-specific features. $S_i(\cdot,\cdot,\cdot)$ may be further defined as a negative squared $L_2$ distance between features extracted from generated example 116 and initial time series data 108 as follows:

$$S_i(y, x_t, t) = -\|E_i(y, t) - E_i(x_t, t)\|_2^2.$$

A more sophisticated $E_i$, beyond operating as a low-pass filter, may be employed to disentangle learning methods of the separate domains.

Still referring to FIG. 1, and still in reference to the non-limiting embodiment of a diffusion-based machine-learning process using EGSDE, solving an energy-guided reverse-time SDE may be accomplished using a pretrained score-based model $s(y,t)$ and energy function, $\mathcal{E}(y,x,t)$, to create generated example 116 from conditional distribution $p(y_0|x_0)$. A fair comparison may be achieved using numerical solvers to approximate trajectories from SDEs. As a non-limiting embodiment, a Euler-Maruyama solver may be used, adopting a step size, h, where the iteration rule from s to t=s−h may be characterized by:

$$y_t = y_s - [f(y, s) - g(s)^2(s(y_s, s) - \nabla_y \mathcal{E}(y_s, x_0, s))]h + g(s)\sqrt{h}z,$$

$$z \sim \mathcal{N}(0, I).$$

A Monte Carlo method may be used to estimate an expectation of a single sample for efficiency. In a non-limiting embodiment, a variance preserve energy-guided SDE may be used to modify the noise prediction network and take it into the sampling procedure in denoising diffusion probabilistic models.

Still referring to FIG. 1, and still in reference to the non-limiting embodiment of a diffusion-based machine-learning process using EGSDE, a product of experts may be used for a discretized sampling process. A conditional distribution at time, t, may be defined as:

$$\tilde{p}(y_t|x_0) = \frac{p_{r1}(y_t|x_0)p_e(y_t|x_0)}{Z_t},$$

where $Z_t$ is a partition function, $P_e(y_t|x_0) \propto \exp(-\mathcal{E}(y_t,x_0,t))$ and $p_{r1}(y_t|x_0)$ is a marginal distribution at time t, based on a pretrained SDE on the target domain. A transition kernel, $\tilde{p}(y_t|y_s)$, may be constructed based on the desirable equilibrium, $\tilde{p}(y_t|x_0) = \int \tilde{p}(y_t|y_s)\tilde{p}(y_s|x_0)dy_s$, where t=s−h:

$$\tilde{p}(y_t|y_s) = \frac{p(y_t|y_s)p_e(y_t|x_0)}{\tilde{Z}_t(y_s)},$$

where $\tilde{Z}_t(y_s)$ is a partition function and $p(y_t|y_s) = \mathcal{N}(\mu(y_s,h), \Sigma(s,h)I)$ is a transition kernel of a pretrained SDE. Using a Taylor expansion around $\mu(y_s,h)$ to approximate low curvature values of $\mathcal{E}(y_t,x_0,t)$, the following may be obtained:

$$\tilde{p}(y_t|y_s) \approx \mathcal{N}(\mu(y_s,h) - \sum(s, h)\nabla_{y'} \mathcal{E}(y', x_0, t)|_{y'=\mu(y_0,h)}, \sum(s, h)I).$$

Solving an energy-guided SDE in a discretization manner may be approximated by sampling from a product of experts as described at the beginning of this paragraph. A conditional distribution, initially defined in the beginning of this paragraph, may be rewritten as:

$$\tilde{p}(y_t|x_0) = \frac{p_{r1}(y_t|x_0)p_{r2}(y_t|x_0)p_f(y_t|x_0)}{Z_t},$$

where $p_{r2}(y_t|x_0) \propto \exp(-\lambda_s \mathcal{E}_s(y_t,x_0,t))$, $p_f(y_t|x_0) \propto \exp(-\lambda_i \mathcal{E}_i(y_t,x_0,t))$. With t=0, transferred samples approximately follow a distribution defined by a product of three experts, where $p_{r1}(y_t|x_0)$ and $p_{r2}(y_t|x_0)$ operate as a realism experts and $p_f(y_t|x_0)$ is a faithful expert, corresponding to a score function $s(y,t)$ and log potential functions $\mathcal{E}_s(y,x,t)$ and $\mathcal{E}_i(y,x,t)$, respectively.

Further referring to FIG. 1, processor 104 may be capable of ingesting additional conditional inputs 132 to further bound and define its generated examples 116. As used herein, "conditional inputs" are extra information provided to both generator model 112 and discriminator model 120 to bias the output from both models. Conditional inputs 132 may be in the form of class labels, or data from other domains that user intends to incorporate to some extent within completed time series data 128. Conditional inputs 132 may include alternate versions of target ECG time series data sets. Additional conditions may further include any graphical data user intends to bias generator model 112. In a non-limiting embodiment conditional input 132 may be a time series data set with different features from either initial time series data 108 or the target time series data as provided by real example 124. This type of mixing of target data sets may enable a hybrid output which retains the benefits of multiple target time series data sets while shedding the undesirable features of each. Conditional inputs 132 may include a font type or color scheme user wants apparatus 100 to incorporate.

Still referring to FIG. 1, generating training data using converted at least a time series may involve generating a plurality of training examples correlating input data to output data as a function of at least an input and at least an expected output. In a non-limiting embodiment, this training data may be provided by user feedback in reference to a completed time series conversion. User feedback may be positive, causing an executed time series conversion process to be validated and promoted for future applications. User feedback may be negative, causing an executed time series conversion process to be invalidated and suppressed for future applications. User may alternatively or additionally generate training data in reference to specific aspects of the conversion process. In a non-limiting embodiment, any domain feature from initial domain protocol or target domain protocol may be corrupted, ignored, overly emphasized, or misinterpreted. Processor 104 may accept feedback to specifically address these types of deficient conversion. In the case of feedback on a specific domain feature and its proper or improper use, processor 104 may make minor alterations to the relevant machine-learning process to apply corrections to future conversion processes. In this way, processor 104 may continually modify its input data to output data relationship. Training data may also be in the form of prior time series conversions. Where successful, no additional user input is necessary. Training data may also use failed prior time series conversions, in conjunction with user feedback addressing the specific failure mechanism such that processor 104 and machine-learning processes may be improved to embrace the correct conversions and reject the method used in the failed conversions.

Continuing to refer to FIG. 1, training of a machine-learning model using training data and at least an analytical process may be based on at least an input and at least an expected output. In reference to a generative model, input may be initial time series data 108, while expected output may be real example 124, or any other validated target domain into which time series data may be converted. Training data may also be in the form of prior time series conversions. Where a conversion is successful, no additional user input may be provided. Training data may also use failed prior time series conversions, in conjunction with user feedback addressing a specific failure mechanism such that processor 104 and machine-learning processes may be improved to embrace the correct conversions and reject the method used in the failed conversions. These types of input to output correlations built over numerous conversions train a machine-learning model to apply appropriate methods dependent on initial time series data 108 and target domain requirements. Still referring to FIG. 1, instantiation of a machine-learning model may be performed on an analytical circuit device. Instantiation of the machine-learning model can be done using hardware rather than software by running the same inputs through a chip where, through transistor gating, the chip executes the same functions as the software would have. The chip can be updated in some cases (e.g. an FPGA can be "configured" to change its circuitry). This instantiation is discussed in detail below in reference to FIG. 3.

All operations and machine-learning processes discussed above may be instantiated completely within processor 104, partially within processor 104 and partially distributed across a neural network or may be completely instantiated within a neural network. Neural networks and their applicability to the disclosure herein are described in detail below in reference to FIGS. 4-5. Instantiation of the machine-learning model is discussed in detail below in reference to FIG. 3.

Figure 2:
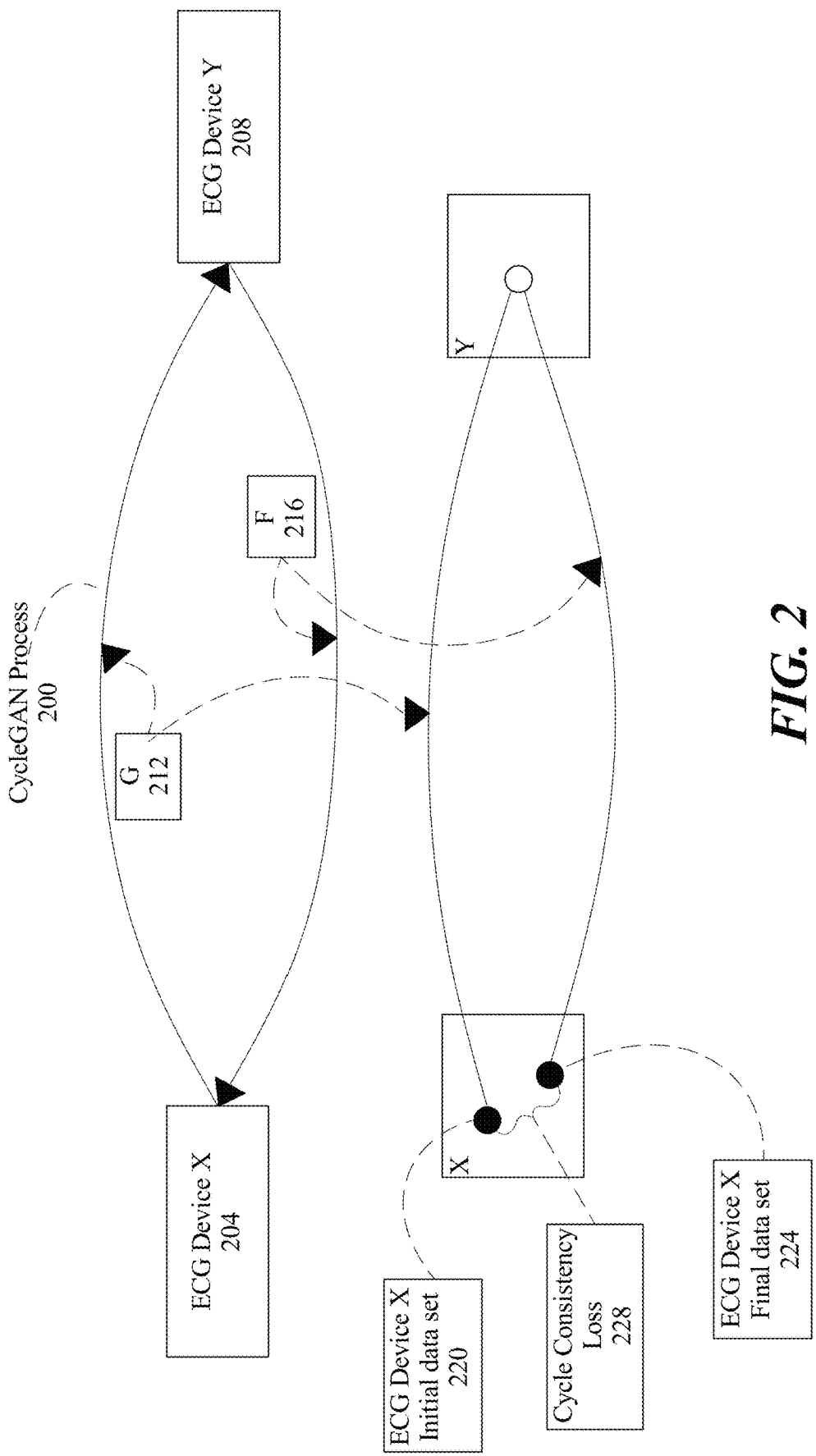
FIG. 2 is a diagram of a generative adversarial network process.

Referring now to FIG. 2, a block diagram of a non-limiting embodiment of a CycleGAN process 200 is illustrated. CycleGANs, as used within this disclosure, are processes used to translate back and forth between time series from one source to another. ECG device X 204 represents data from source 1 (e.g. GE machines), ECG device Y 208 represents data from source 2 (e.g. Apple watch). G 212 and F 216 represent forward (source 1 to source 2) and backward (source 2 to source 1) generators, respectively, translating one source to another. ECG device X initial data set 220 is converted to the format of ECG device Y through forward function G 212. That same data set is then translated back to the format of ECG device X through backward function F 216. Ideally, this process reproduces an exact replica of ECG device X initial data set 220. But for many iterations, ECG device X final data set 224 may be offset from ECG device X initial data set 220. In these cases, the generated offset is referred to as cycle consistency loss 228. The measure of cycle consistency loss 228 is used as training data to update the models contained within forward function G 212 and backward function F 216, with the final goal being to reduce cycle consistency loss 228 to negligible or zero.

Figure 3:
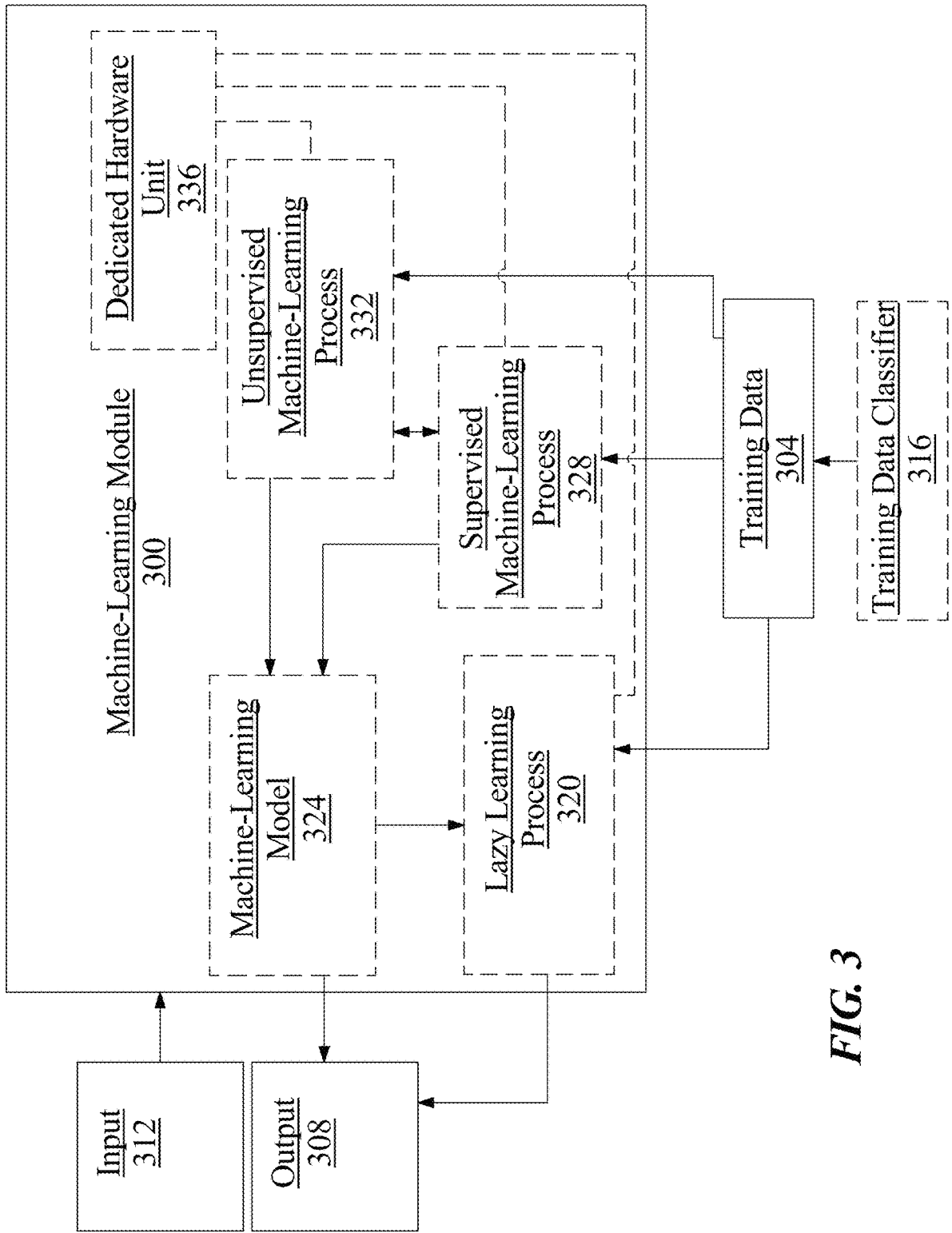
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module 300 may perform determinations, classification, and/or analysis steps, methods, processes, or the like as described in this disclosure using machine-learning processes. A "machine-learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine-learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," which may be in the form of binary classifications of examples as real or fake, wherein a correct assessment of fake would cause generator model to update its internal algorithms to produce more convincing examples. Similarly an incorrect assessment of real would cause discriminator model to improve its detection and classification internal algorithms. No matter the result, every iteration of discriminator model assessing a generated example will produce training data to adapt one of either generator model or discriminator model. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may also include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data. These types of data entries may be used to provide the real-world examples representative of the target domain time series data protocols and formats.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to an Apple watch time series data set but exclude those classifiers from other inappropriate device types.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as time series data, images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more detected blurs. Detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures blurriness based on the gradient or first derivative of an image, based on the hypothesis that rapid changes indicate sharp edges in the image, and thus are indicative of a lower degree of blurriness. Blur detection may be performed using a Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a KNN, a lazy naïve Bayes algorithm, or the like. Persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. With regard to the current disclosure, both generator model and discriminator model are machine-learning models as described above.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine-learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Continuing to refer to FIG. 3, machine-learning model 324 may be configured using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor may then calculate a likelihood table by calculating probabilities of different data entries and classification labels. Processor may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 3, machine-learning model 324 may be configured using a KNN algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value determining the most common classifier of the entries in the database and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating KNN algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $1=\sqrt{\Sigma_{i=0}{}^{n}\alpha_i{}^2}$, where $\alpha_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as, without limitation, Field Programmable Gate Arrays (FPGAs), production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
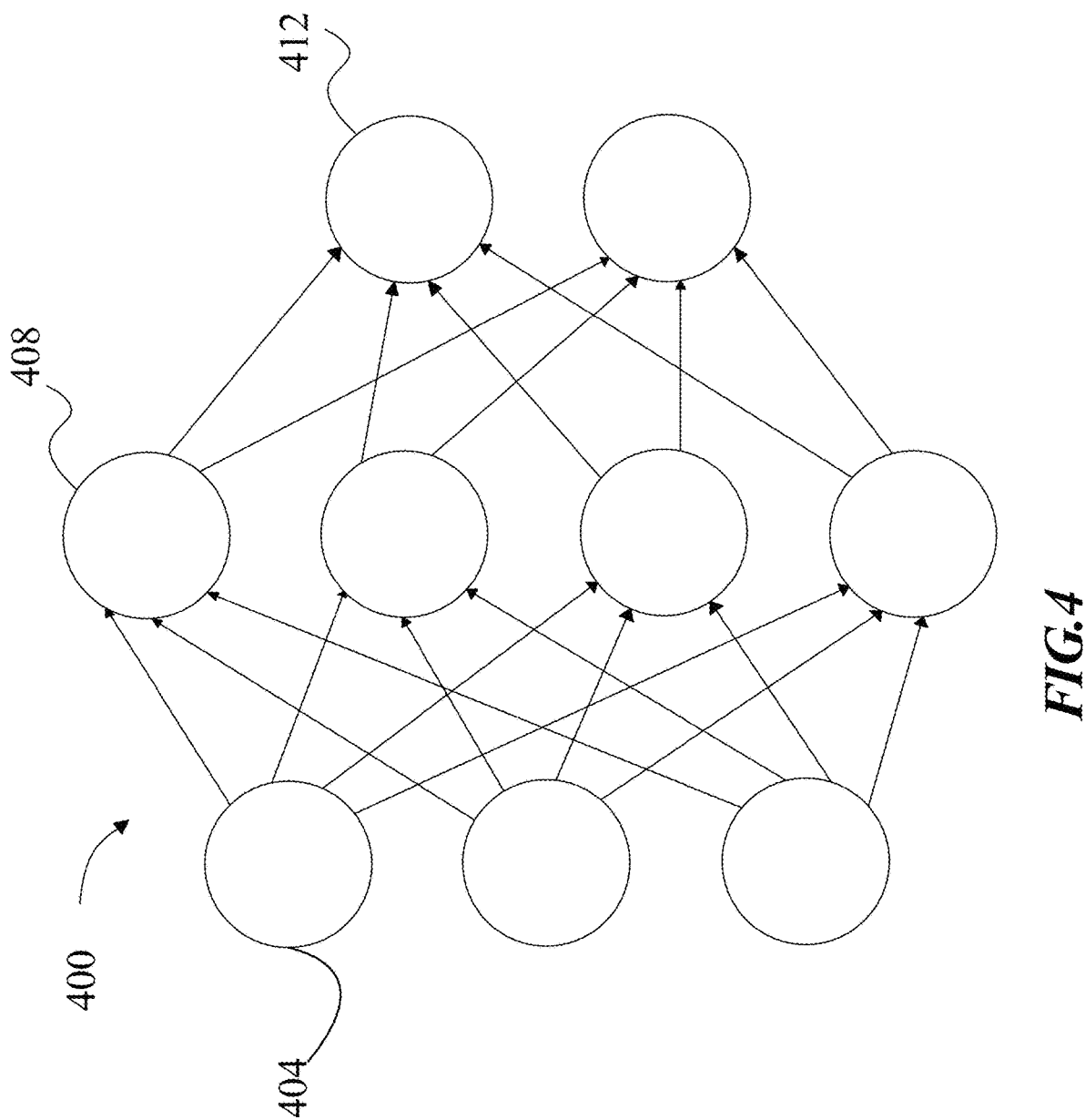
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 4, in a non-limiting embodiment, a neural network may be built around the multitude of simultaneously operational or standby ECG devices and their affiliated networks. Each individual ECG device may be an input node 404, intermediate node 408, output node 412, or a combination of the three as applicable. In cases where bandwidth or data is limited, the remote devices would be primarily input nodes and the majority of processing by machine-learning model would be done remotely. To optimize system operation, machine-learning model may dictate certain remote devices manage the processing to minimize time expended in the analysis and provide feedback to user as close to real-time as possible.

Figure 5:
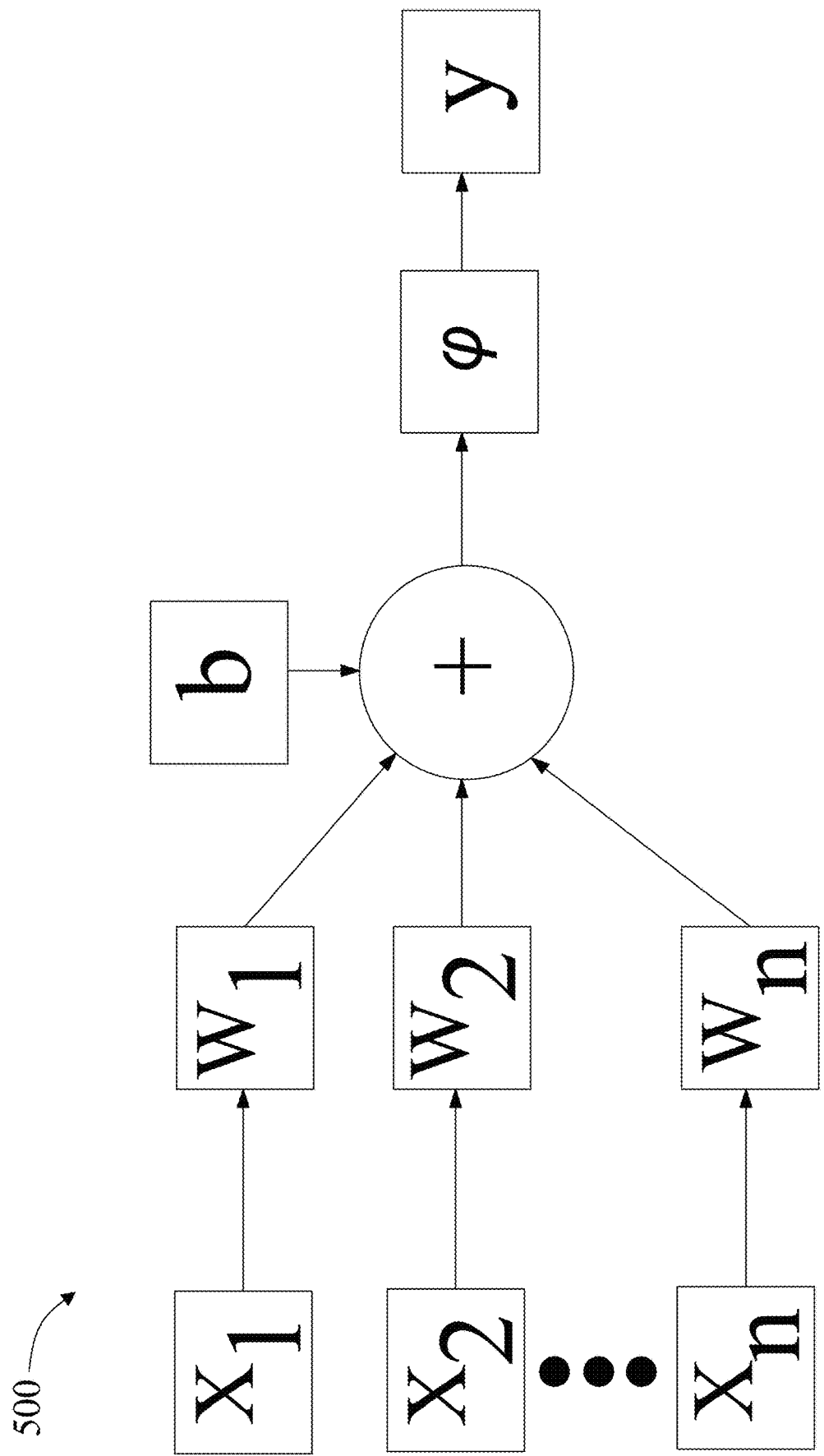
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
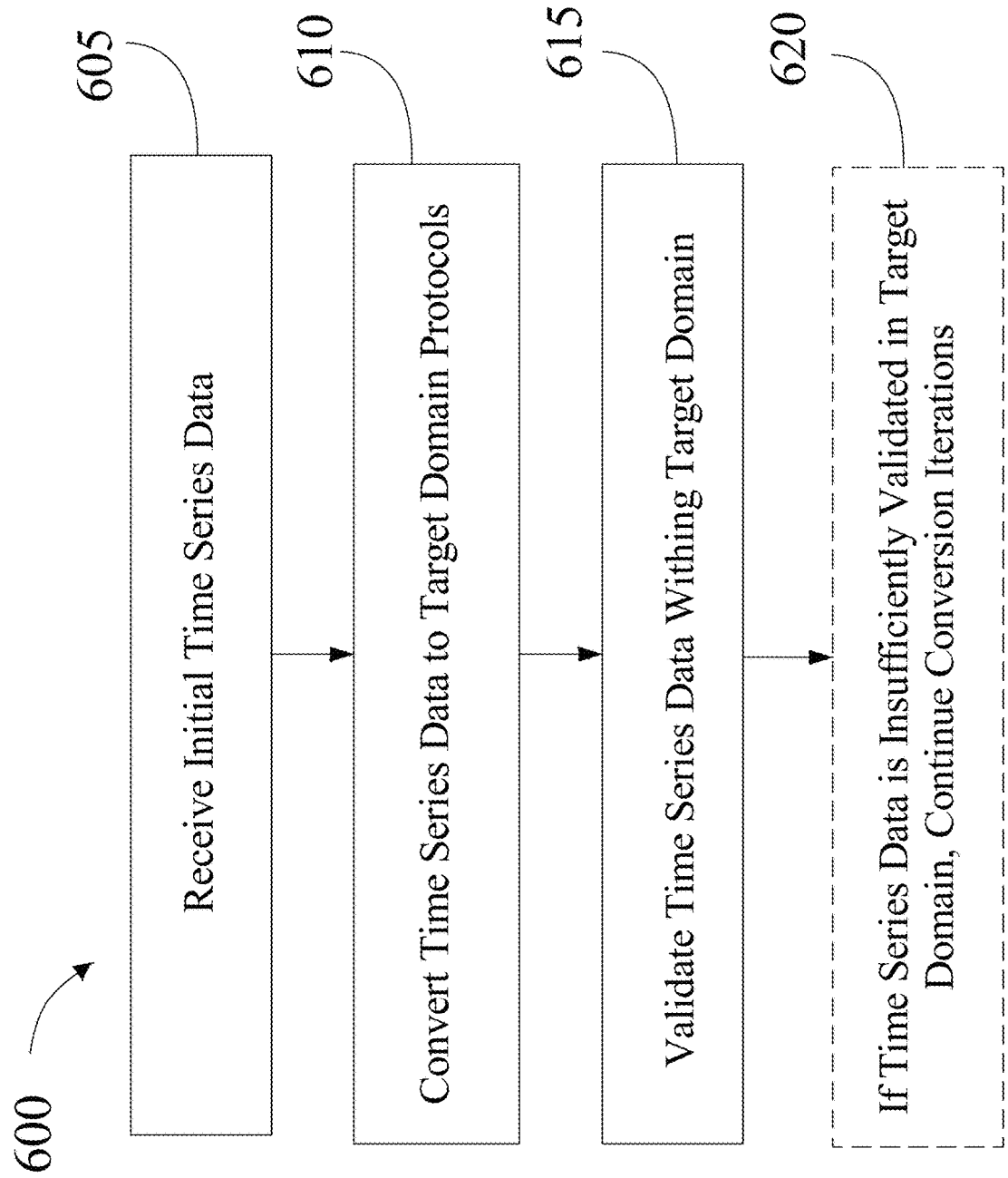
FIG. 6 is a flow diagram of an exemplary method for unpaired time series to time series translation.

Referring now to FIG. 6, a flow diagram of an exemplary method 600 for unpaired time series to time series translation is illustrated. At step 605, method 600 includes receiving, using at least a processor, initial time series data from the source domain. This may be implemented as described and with reference to FIGS. 1-12.

Still referring to FIG. 6, at step 610, method 600 includes converting, using at least a processor, time series data to the target domain time series protocols such that the source time series data is usable within the target domain. This may be implemented as described and with reference to FIGS. 1-12.

Still referring to FIG. 6, at step 615, method 600 includes validating, using at least a processor, time series data in the target domain. Validation may be accomplished in multiple manners, including use of a discriminator model. This may be implemented as described and with reference to FIGS. 1-12.

Still referring to FIG. 6, at step 620, method 600 may include continuing conversion, using the at least a processor, the time series data if it is insufficiently compatible with target domain protocols. This may be implemented as described and with reference to FIGS. 1-12.

Figure 7:
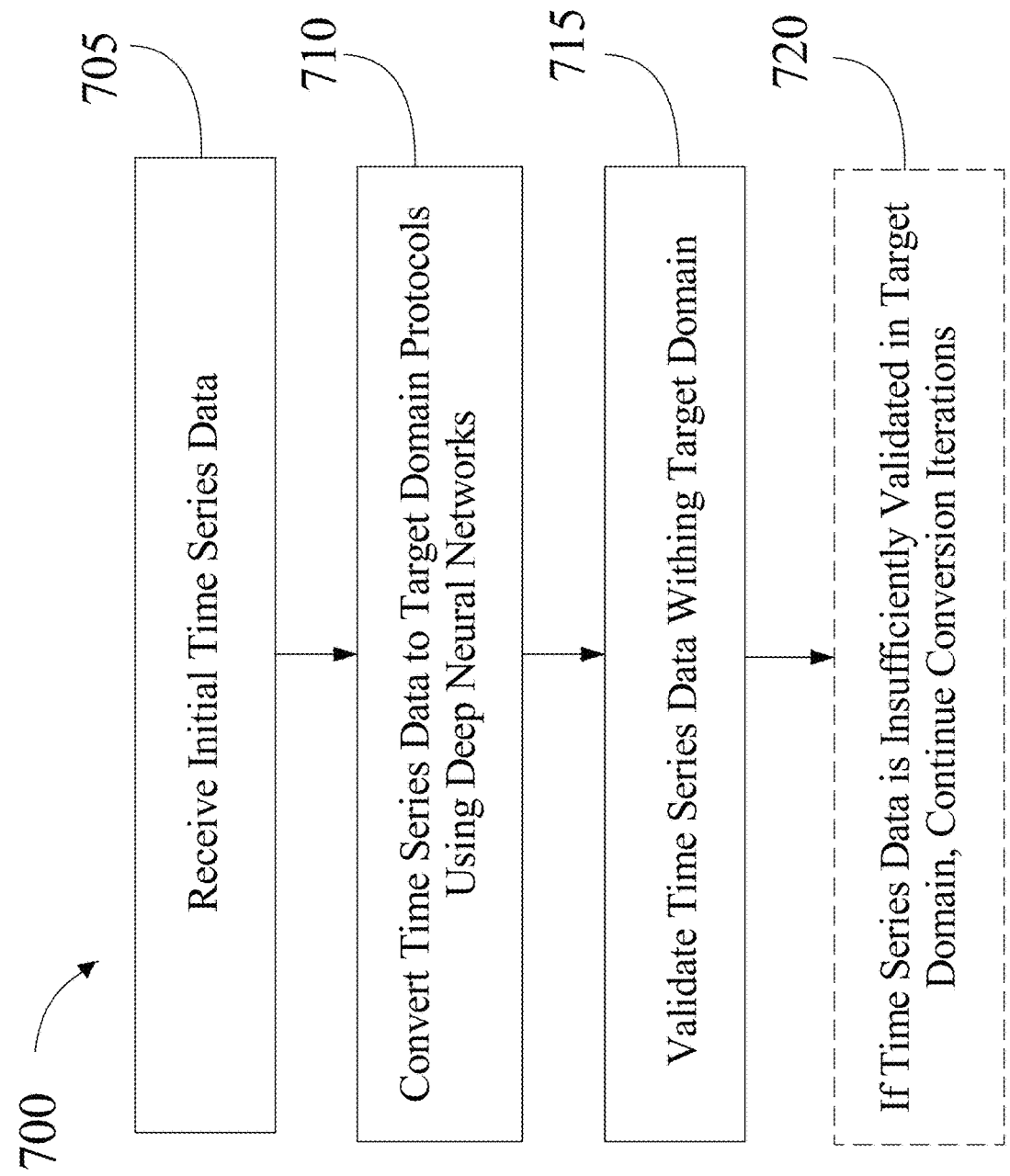
FIG. 7 is a flow diagram of an exemplary method for unpaired time series to time series translation using deep neural networks.

Referring now to FIG. 7, a flow diagram of an exemplary method 700 for unpaired time series to time series translation is illustrated. FIG. 7 reflects same flow and steps as FIG. 6, but incorporates a deep neural network as the primary device conducting the conversion. This may be implemented as described and with reference to FIGS. 1-12.

Figure 8:
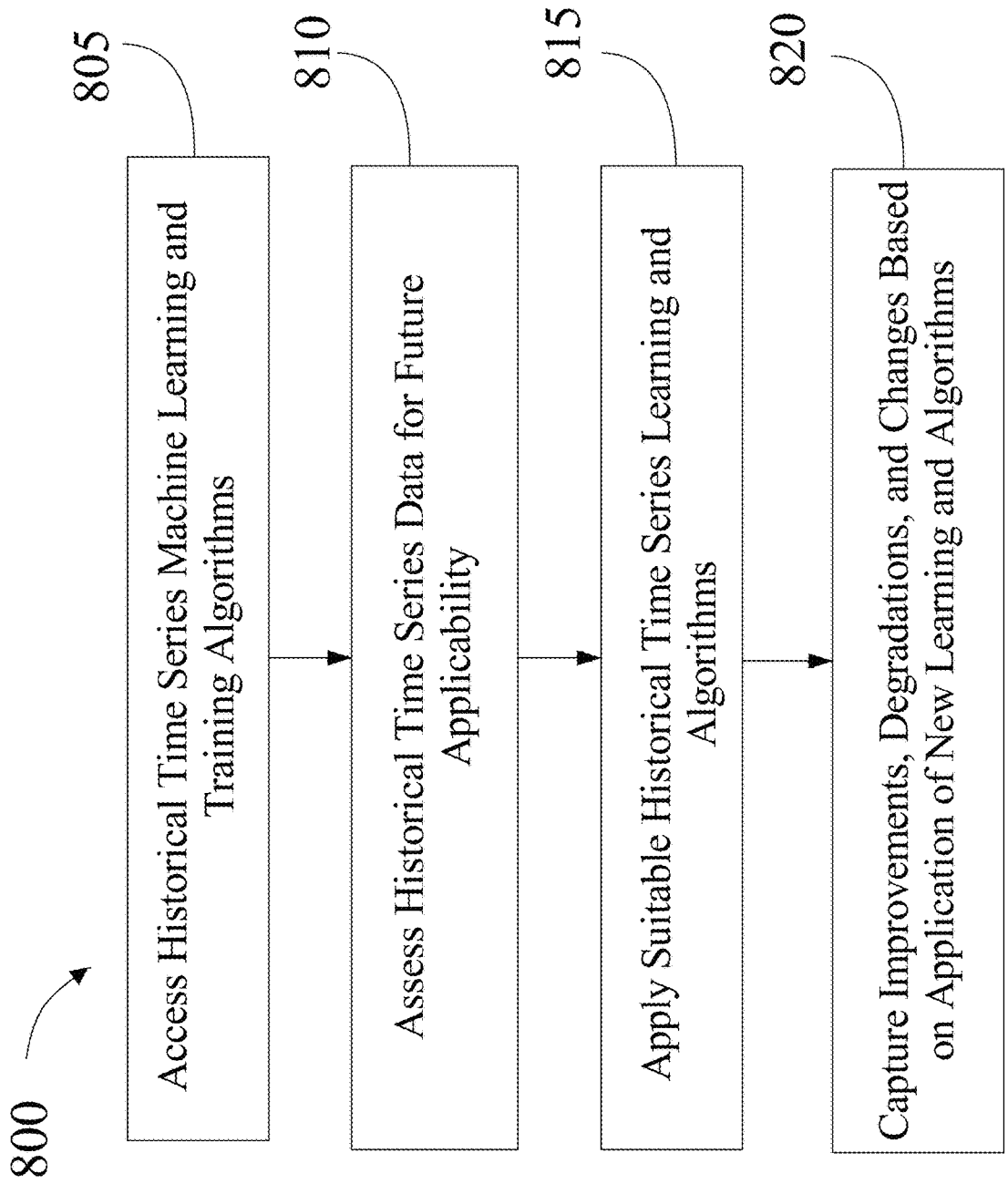
FIG. 8 is a flow diagram of an exemplary method for optimizing time series sensor systems.

Referring now to FIG. 8, a flow diagram of an exemplary method 800 for optimization of time series sensor system effectiveness is illustrated. At step 805, method 800 includes accessing a historical time series database containing the machine learning processes, training, and algorithms. This may be implemented as described and with reference to FIGS. 1-12.

Still referring to FIG. 8, at step 810, method 800 includes assessing the historical time series data and associated machine learning processes, training, and algorithms for applicability in any future time series operation. This may be implemented as described and with reference to FIGS. 1-12.

Still referring to FIG. 8, at step 815, method 800 includes applying the historical time series data and associated machine learning processes, training, and algorithms that is deemed to be applicable and helpful for future time series operations. Application of this data may be used as training data to improve current machine-learning processes. This may be implemented as described and with reference to FIGS. 1-12.

Still referring to FIG. 8, at step 820, method 800 includes capturing any improvements, degradations, and changes caused by the application of historical time series training data to the current machine-learning process. This may be implemented as described and with reference to FIGS. 1-12.

Figure 9:
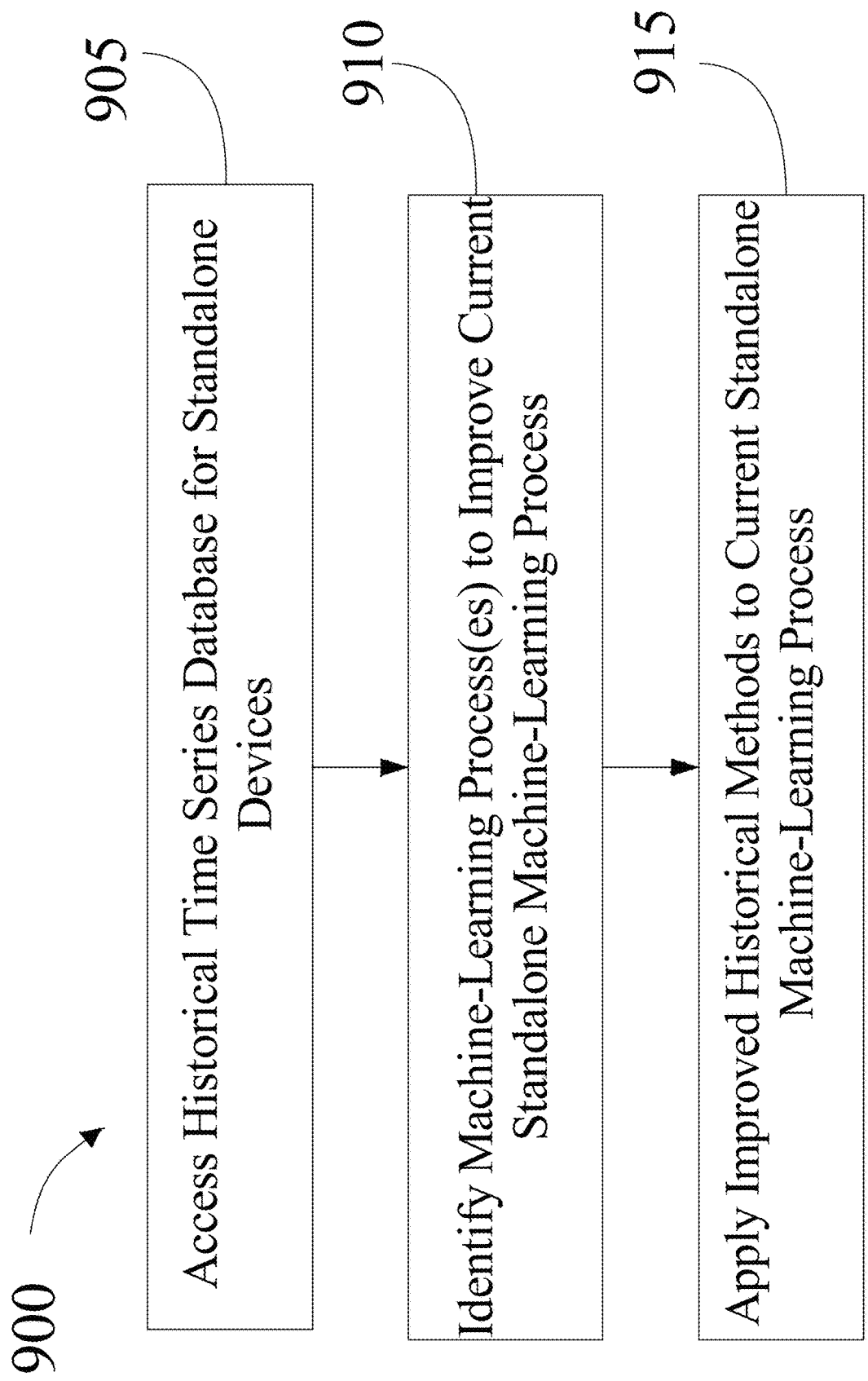
FIG. 9 is a flow diagram of an exemplary method for improving unpaired time series to time series translation in standalone devices.

Referring now to FIG. 9, a flow diagram of an exemplary method 900 for improving the specific data and manner of capture of time series sensor systems within standalone devices is illustrated. At step 905, method 900 includes accessing a historical time series database retaining standalone device data. This may be implemented as described and with reference to FIGS. 1-12.

Still referring to FIG. 9, at step 910, method 900 includes identifying any machine-learning processes that may be used to improve current standalone device machine-learning processes. This may be implemented as described and with reference to FIGS. 1-12.

Still referring to FIG. 9, at step 915, method 900 includes applying the machine-learning process improvements from the historical database to the current machine-learning process as used in the current standalone device. This may be implemented as described and with reference to FIGS. 1-12.

Figure 10:
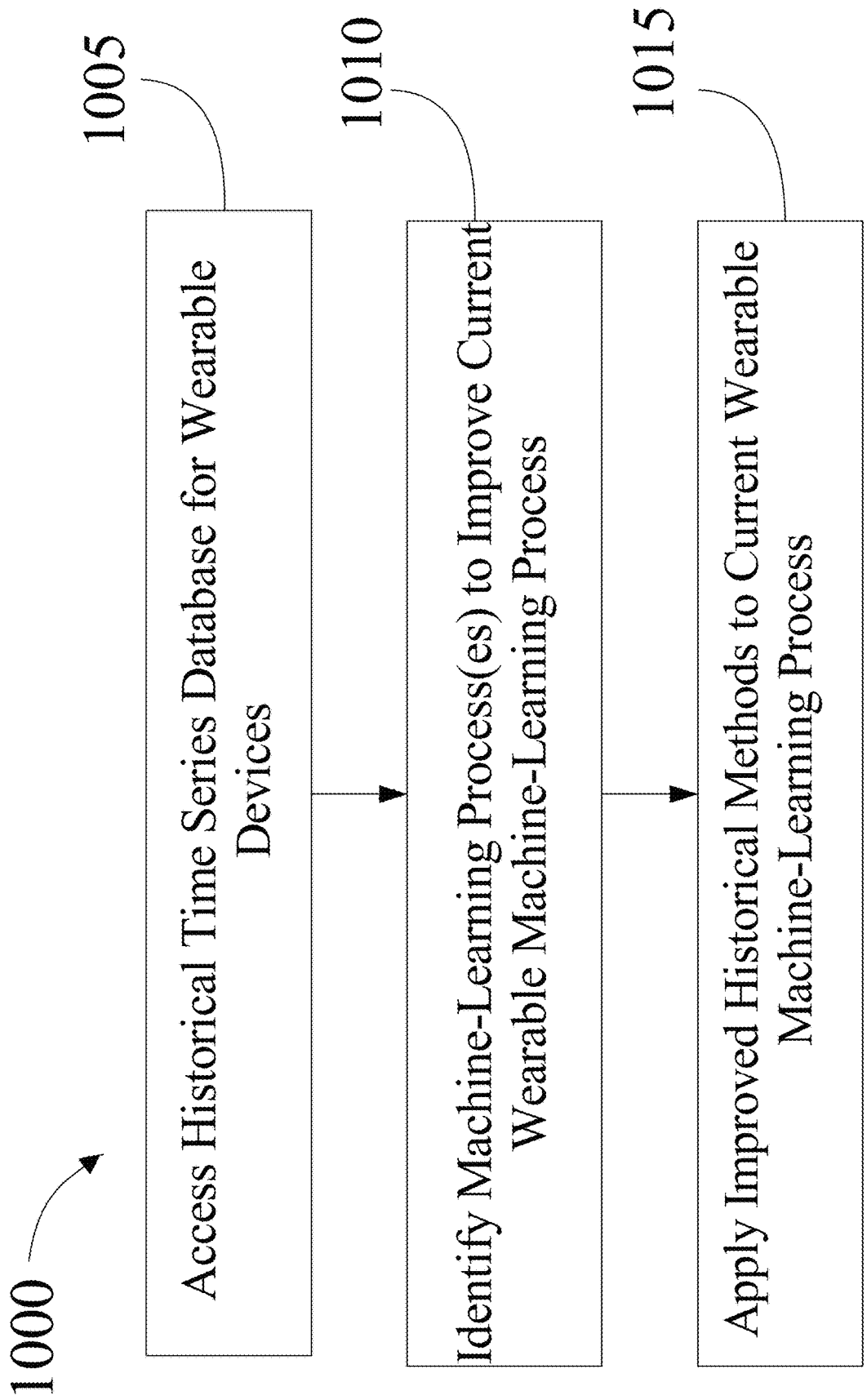
FIG. 10 is a flow diagram of an exemplary method for improving unpaired time series to time series translation in handheld or wearable devices.

Referring now to FIG. 10, a flow diagram of an exemplary method 1000 for improving the specific data and manner of capture of time series sensor systems within wearable devices is illustrated. Method 1000 relies on the same steps as method 900 above, except applies only to wearable devices. This may be implemented as described and with reference to FIGS. 1-12.

Figure 11:
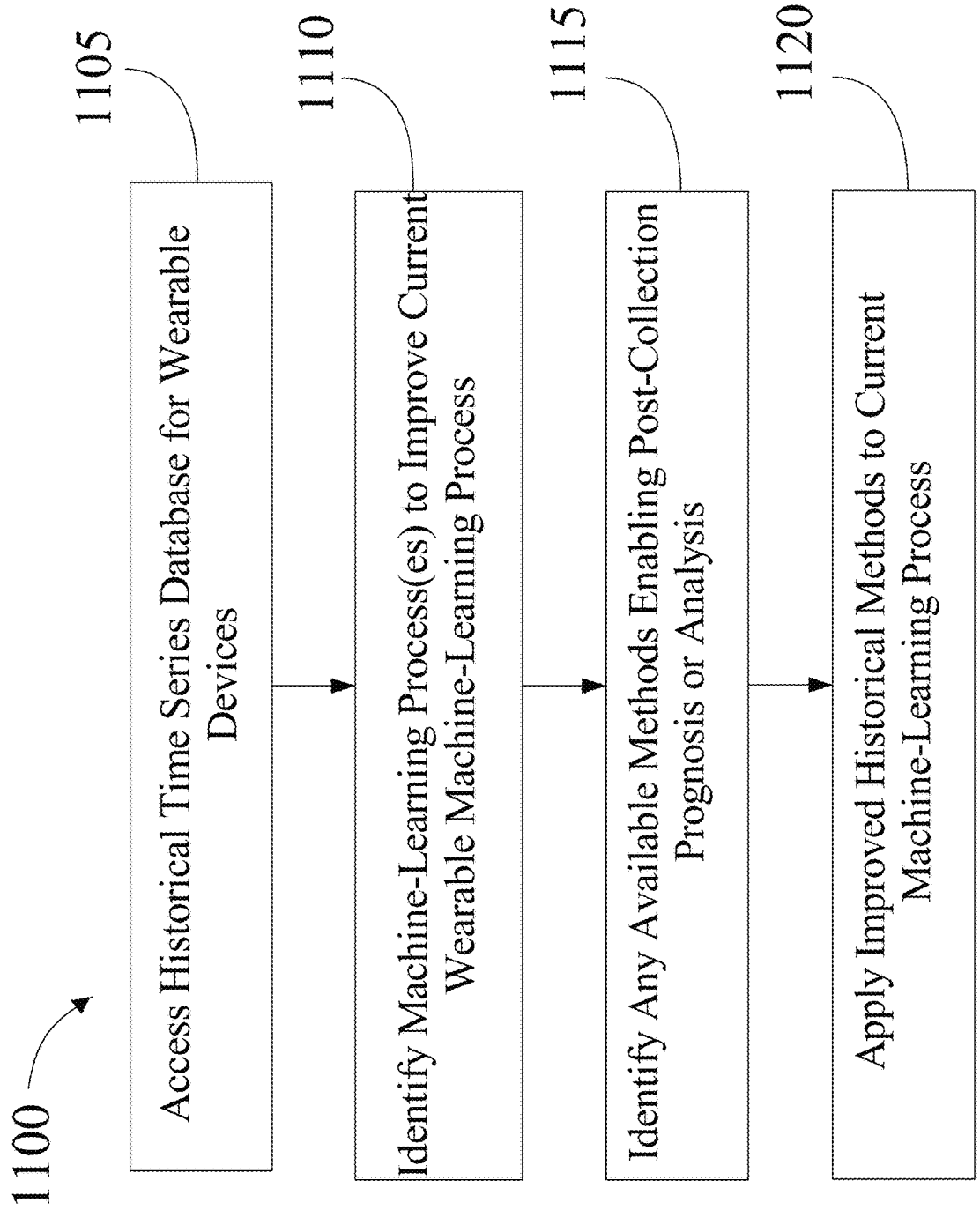
FIG. 11 is a flow diagram of an exemplary method for improving the data, manner of capture, and analysis of time series sensors.

Referring now to FIG. 11, a flow diagram of an exemplary method 1100 for improving the data, manner of capture, and analysis of time series sensor systems in wearable medical devices is illustrated. At step 1105, method 1100 includes accessing a database containing historical time series data for wearable devices. This may be implemented as described and with reference to FIGS. 1-12.

Still referring to FIG. 11, at step 1110, method 1100 includes identifying any historical machine-learning processes or input to output correlations that may improve upon current machine-learning processes as they apply to wearable devices. This may be implemented as described and with reference to FIGS. 1-12.

Still referring to FIG. 11, at step 1115, method 1100 includes identifying any historical methods which enabled or promoted an ability to refine post-collection analysis or prognosis information. This may be implemented as described and with reference to FIGS. 1-12.

Still referring to FIG. 11, at step 1120, method 1100 includes applying the improved historical methods to the current machine-learning process as it applies to wearable devices. This may be implemented as described and with reference to FIGS. 1-12.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
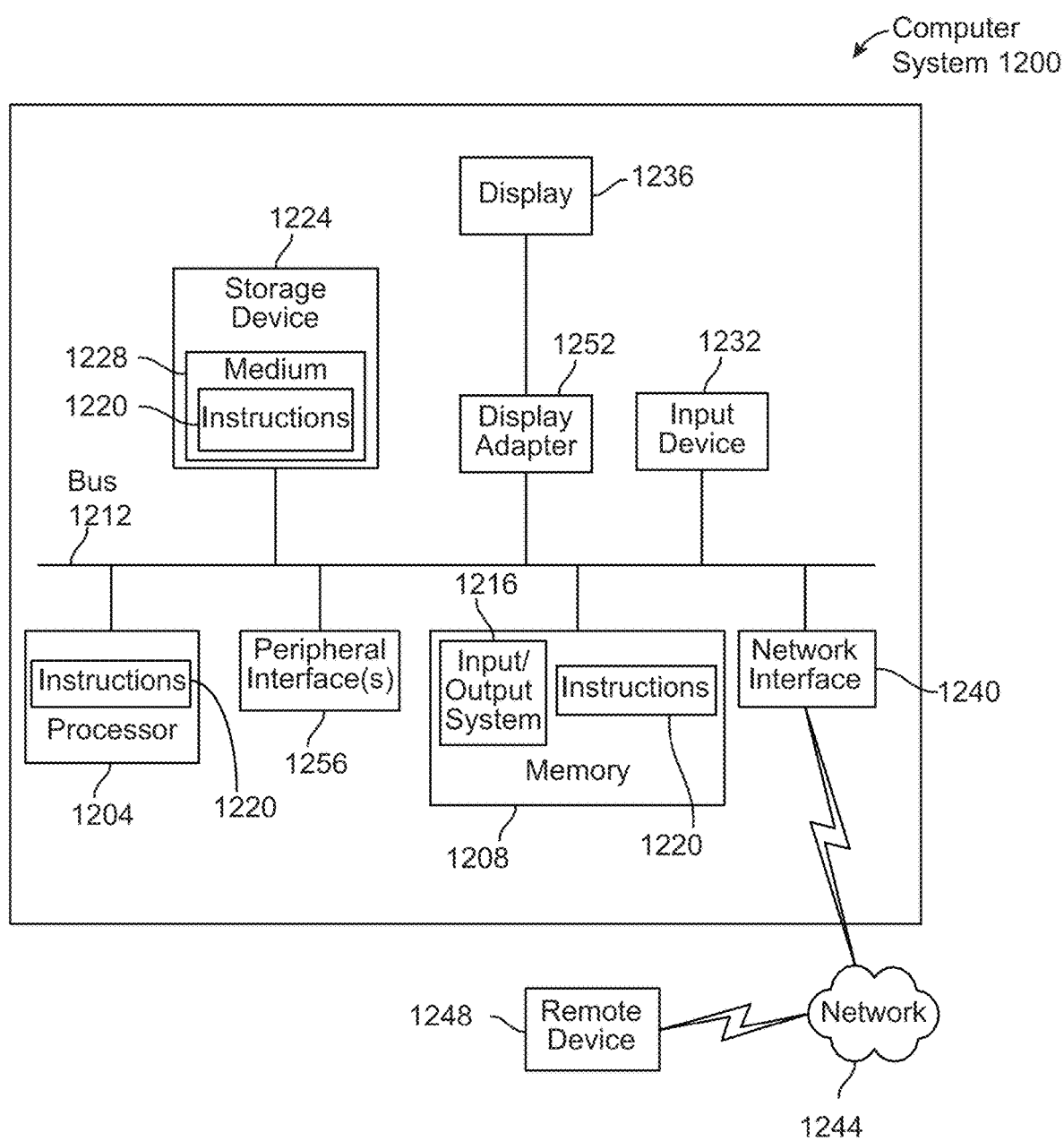
FIG. 12 is a block diagram of a computing system that can be used to implement any one or more of the methodologies disclosed herein and any one or more portions thereof.

Referring now to FIG. 12, a diagrammatic representation of one embodiment of a computing device in the exemplary form of a computer system 1200 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), FPGA, Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media)

instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for machine learning using unpaired time series time series translation, wherein the apparatus comprises:
    at least a processor, and a memory communicatively connected to the at least a processor, the memory containing instructions configuring the at least a processor to:
        receive, from at least a sensor, at least a time series of measured values, wherein the time series of measured values is recorded using at least an initial domain protocol, wherein the at least a time series of measured values comprises at least an additional data tag, and wherein the at least an additional data tag comprises descriptive data configured to support targeted time series data;
        convert the at least a time series from the initial domain protocol to a target domain protocol using an unsupervised generative machine-learning process, wherein the target domain protocol comprises reducing a dimensionality of the initial domain protocol;

validate, using the computing device, the conversion, wherein validating the conversion comprises:
reverse-translating the time series data set back to the initial domain; and
comparing the translated time series data set to a confidence threshold using a second machine learning model, wherein the second machine learning model comprises a pretrained energy function adapted using data from both the initial domain and the target domain to guide inference within a reverse-time stochastic differential equation process;

generate training data using the converted at least a time series, wherein the training data comprises the at least an additional data tag;

accept at least a user feedback to address a deficient conversion of the time series, wherein the at least a processor applies a correction to a future conversion of the time series;

train a machine-learning model using the training data, wherein the machine-learning model is configured to identify at least a pattern within the at least an additional data tag; and instantiate the machine-learning model on an electrocardiogram device.

2. The apparatus of claim 1, wherein:
the at least a time series further comprises a first time series recorded using first initial domain protocol and a second time series recorded using a second initial domain protocol; and
the second initial domain protocol is distinct from the first initial domain protocol.

3. The apparatus of claim 2, wherein converting the at least a time series further comprises:
converting the first initial domain protocol to a common domain protocol; and
converting the second initial domain protocol to the common domain protocol.

4. The apparatus of claim 1, wherein the generative machine-learning process further comprises a generative adversarial network machine-learning process.

5. The apparatus of claim 1, wherein the generative machine-learning process further comprises a diffusion-based machine-learning process.

6. The apparatus of claim 1, wherein the generative machine-learning process further comprises a generative machine-learning process using at least a deep neural network.

7. The apparatus of claim 6, wherein the at least a deep neural network includes a plurality of deep neural networks.

8. The apparatus of claim 1, wherein converting further comprises converting using a plurality of conditional inputs.

9. The apparatus of claim 1, wherein:
generating the training data further comprises generating a plurality of training examples correlating input data to output data as a function of at least an input and at least an expected output.

10. The apparatus of claim 1, further configured to:
retranslate the at least a time series from a common protocol to the at least an initial protocol; and
validate the converted time series as a function of the retranslation.

11. A method for translating unpaired time series to time series, wherein the method comprises:
receiving, by a computing device, an automated analysis of a time series data set, wherein the time series of dataset comprises at least an additional data tag, and wherein the at least an additional data tag comprises descriptive data configured to support targeted time series data;

converting, by the computing device, the time series data set of an initial domain protocol to usable data, wherein converting the time series data set comprises reducing a dimensionality of the initial domain protocol using an unsupervised generative machine-learning process;

validating, by the computing device, the conversion, wherein validating the conversion comprises:
reverse-translating the time series data set back to the initial domain; and
comparing the translated time series data set to a confidence threshold using a second machine learning model, wherein the second machine learning model comprises a pretrained energy function adapted using data from both the initial domain and the target domain to guide inference within a reverse-time stochastic differential equation process;

generating, by the computing device, training data as function of validated usable data, wherein the training data comprises the at least an additional data tag;

accepting at least a user feedback to address a deficient conversion of the time series, wherein the at least a processor applies a correction to a future conversion of the time series;

training, by the computing device, a machine learning model using the training data, wherein the machine-learning model is configured to identify at least a pattern within the at least an additional data tag;

instating the machine-learning model on an electrocardiogram device.

12. The method of claim 11, wherein the unsupervised generative machine learning model comprises a Generative Adversarial Network.

13. The method of claim 11, wherein converting the time series data set comprises converting the time series data set using a diffusion model based on an energy-guided stochastic differential equation process.

14. The method of claim 11, wherein receiving the automated analysis of the time series data set comprises receiving the automated analysis of the time series data set using a network of connected devices.

15. The method of claim 11, wherein receiving the automated analysis of the time series data set comprises receiving the automated analysis of the time series data set from a scanned image using optical character recognition.

16. The method of claim 12, wherein the Generative Adversarial Network is configured to:
iteratively map an input to an output; and
comparatively eliminate cycle consistency losses as referenced against a concurrent mapping sequence.

* * * * *